(12) United States Patent
McAuliffe et al.

(10) Patent No.: US 8,655,721 B2
(45) Date of Patent: Feb. 18, 2014

(54) METHOD AND APPARATUS FOR PRIVACY NEGOTIATION

(75) Inventors: Kevin P. McAuliffe, Cortland Manor, NY (US); Robert M. Szabo, Boca Raton, FL (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/343,097

(22) Filed: Dec. 23, 2008

(65) Prior Publication Data

US 2009/0106166 A1 Apr. 23, 2009

Related U.S. Application Data

(62) Division of application No. 09/897,226, filed on Jul. 2, 2001, now abandoned.

(51) Int. Cl.
*G06Q 30/00* (2012.01)
(52) U.S. Cl.
USPC .......................................... 705/14.23; 705/80
(58) Field of Classification Search
USPC ................................................. 705/14.23, 80
See application file for complete search history.

(56) References Cited

U.S. PATENT DOCUMENTS

| | | | |
|---|---|---|---|
| 5,794,207 A | 8/1998 | Walker et al. | |
| 5,794,210 A * | 8/1998 | Goldhaber et al. | 705/14.69 |
| 6,035,288 A | 3/2000 | Solomon | |
| 6,553,347 B1 * | 4/2003 | Tavor et al. | 705/14.25 |
| 7,756,772 B1 * | 7/2010 | Konopnicki et al. | 705/37 |
| 2002/0178103 A1 | 11/2002 | Dan et al. | |
| 2003/0014325 A1 * | 1/2003 | Biffar et al. | 705/26 |
| 2004/0133526 A1 * | 7/2004 | Shmueli et al. | 705/80 |
| 2005/0119980 A1 * | 6/2005 | Kohavi et al. | 705/80 |

FOREIGN PATENT DOCUMENTS

WO          WO 0043853 A2 *   7/2000

OTHER PUBLICATIONS

Cranor, et al., "The Platform for Privacy Preferences 1.0" (P3P1.0) Specification, pp. 1-146 (last visited Sep. 4, 2001), <http://www.w3.org/TR/P3P/>.

* cited by examiner

*Primary Examiner* — Michael Bekerman
(74) *Attorney, Agent, or Firm* — Novak Druce Connolly Bove + Quigg LLP

(57) ABSTRACT

A method of negotiating an electronic commerce (e-commerce) transaction for the sale of a selected good can include identifying an asking price for the selected good and retrieving from memory merchant business objectives (MBOs) and consumer privacy rules (CPRs). The MBOs can specify incentive information corresponding to a proposed exchange of consumer information and the CPRs can specify asking prices corresponding to the proposed exchange of consumer information. The MBOs can be compared to the CPRs to determine if an agreement can be reached for the sale of the selected good with an incentive based upon the proposed exchange of consumer information. The e-commerce transaction for the sale of the selected good with the incentive can be consummated if in the comparing step it is determined that an agreement can be reached.

36 Claims, 4 Drawing Sheets

METHOD AND APPARATUS FOR PRIVACY NEGOTIATION

CROSS-REFERENCE TO RELATED APPLICATIONS

This application is a divisional application of, and accordingly claims the benefit of, U.S. application Ser. No. 09/897,226, filed in the U.S. Patent and Trademark Office on Jul. 2, 2001 now abandoned, the disclosure of which is hereby incorporated by reference.

BACKGROUND OF THE INVENTION

1. Technical Field

This invention relates to the field of electronic commerce, and more particularly, to negotiating the exchange of consumer information with a merchant.

2. Description of the Related Art

The buying and selling of goods and services over the Internet, commonly referred to as electronic commerce (e-commerce) has continued to experience rapid growth as an industry. In the face of ever increasing competition, some have tried to gain a competitive advantage by modeling e-commerce transactions after typical human interactions. This business strategy can attract consumers by providing them with a method of attaining a favorable price rather than paying a single fixed price. One such example is the on-line auction format. Another example is U.S. Pat. No. 6,035,288 to Robert S. Solomon (the '288 patent). The '288 patent provides a method and system which patterns an electronic transaction after conventional merchant and consumer haggling in a bazaar-like atmosphere. By successfully haggling with the merchant and gauging the merchant's emotional state, the consumer can negotiate a favorable price for a particular good or service. In dealing with the consumer, however, the merchant can rely upon past dealings with the consumer as well as solicited consumer information to formulate suitable counter-offers. Though the aforementioned systems allow consumers to deal for a favorable product price, still, consumers are limited to making monetary counter-offers. The consumers cannot offer the merchant anything of value other than money.

Another important business strategy relating to e-commerce is the acquisition of consumer information. The acquisition of consumer information allows merchants to significantly increase sales through targeted advertising and other sales techniques such as cross-selling, up-selling, and data mining. Consequently, many merchants generally have tried to obtain increasingly larger amounts of consumer information. In fact, the sale of consumer information has evolved into an industry in and of itself. The one party that actually owns this information, however, namely the consumer, is routinely excluded from participating in the sale of this information. Moreover, consumers have little control over the proliferation of their own information.

Many consumers have become increasingly sensitive to the proliferation of private information, especially over the Internet. While consumers can be willing to provide particular information such as a name, address, and credit card information necessary to complete a financial transaction, the giving of other private information such as one's salary, insurance, or other personal financial information is generally viewed as being non-essential to the completion of a financial transaction. Oftentimes, the mere inquiry into such private information can be viewed as an invasion of privacy which can alienate the consumer from the merchant. Accordingly, many consumers do not wish to disclose private information.

Many e-commerce sites, however, not only ask consumers for private information, but can predicate a transaction upon receiving that information. In consequence, merchants can lose a sale by demanding private consumer information for a given transaction. Additionally, if merchants persist in asking for sensitive consumer information, or if the consumers are uneasy about the manner in which the merchant uses acquired information, the consumer can develop a distrust for the merchant and cease to visit the e-commerce Web site.

Some aspects of consumer privacy relating to e-commerce have been addressed by the World Wide Web Consortium (W3C). The W3C has developed the Platform for Privacy Preferences 1.0 (P3P1.0) Specification, which is available at <http://www.w3.org/TR/P3P/>. The P3P1.0 Specification specifies an automated way in which users can gain more control over the use of personal information by the Web sites that they visit. Generally, P3P standardizes particular aspects of a privacy policy of a Web site. A P3P enabled Web site can provide the privacy policy information to a P3P enabled browser. Consequently, the consumer can choose whether to interact with the Web site based upon the published privacy policy. This implementation, however, does not provide the consumer with an ability to negotiate or otherwise alter the terms of the privacy policy of the Web site.

SUMMARY OF THE INVENTION

The invention concerns a method and system for automatically negotiating the exchange of consumer information between a merchant and a consumer during an electronic commerce (e-commerce) transaction. In particular, during a potential e-commerce transaction for the purchase of a good, which can include a good or a service, the consumer and the merchant can modify the terms of the transaction based upon an agreed upon exchange of private consumer information items. In accordance with the inventive arrangements disclosed herein, a consumer can specify items of private consumer information which can be distributed to merchants, in addition to assigning valuations to those items of information.

The merchant can specify a series of rules comprising a privacy policy and business objectives which can include particular items of consumer information that the merchant desires. Additionally, the merchant can specify various incentives to be offered to the consumer in exchange for private consumer information during a transaction. Accordingly, based upon the identity of the consumer, the good identified for purchase, the merchant objectives, and any other information previously known about the consumer, the merchant can offer an incentive such as a discount, money or other cash equivalent, as well as additional goods to the consumer in exchange for the particular items of consumer information. In consequence, a back-and-forth negotiation can ensue. The invention disclosed herein, provides an automated and a semi-automated method and a system for negotiating this transaction.

One aspect of the present invention can be a method of negotiating an e-commerce transaction for the sale of a selected good. The method can include identifying an asking price for the selected good and retrieving from memory merchant business objectives (MBOs) and consumer privacy rules (CPRs). The MBOs can specify incentive information corresponding to a proposed exchange of consumer information; and the CPRs can specify asking prices corresponding to the proposed exchange of consumer information. Alternatively, the CPRs can be received as an input from the user.

Regardless, the MBOs can be compared with the CPRs to determine if an agreement can be reached for the sale of the selected good with an incentive based upon the proposed exchange of consumer information. Notably, the incentive can be a discount, an additional good, cash, or a cash equivalent. The CPRs can specify an acceptable incentive type for the selected good.

The comparing step can include receiving a counter-offer wherein the counter-offer can specify an adjusted incentive or an adjusted asking price corresponding to the proposed exchange of consumer information. Still, the comparing step can include adjusting the incentive consistent with the MBOs or adjusting the asking price consistent with the CPRs. It should be appreciated that the comparing step can be biased in favor of a consumer or a merchant. The e-commerce transaction for the sale of the selected good with an incentive can be consummated if in the comparing step it is determined that an agreement can be reached. The agreed upon transaction information can be provided to an e-commerce processing system for processing the e-commerce transaction.

Another aspect of the invention can include a method of configuring MBOs. The method can include identifying an item of consumer information desired by a merchant and specifying at least one incentive for the item of consumer information. The incentive can be offered to a consumer in exchange for the item of consumer information. An indication of the item of consumer information and the corresponding incentive can be stored in a data store.

Another aspect of the invention can include a method of configuring CPRs. The method can include identifying an item of consumer information which a consumer will provide to a merchant and specifying at least one incentive for the item of consumer information in exchange for which the consumer will provide the item of consumer information to a merchant. The item of consumer information and the minimum incentive can be stored in a data store.

Another aspect of the invention can include a privacy negotiation system for negotiating an electronic commerce transaction involving a transfer of selected consumer information items. The system can include a merchant objectives data store comprising rules for offering incentives to a consumer during the electronic commerce transaction. The incentives can be conditioned upon the transfer of the selected consumer information items from the consumer to a merchant. A negotiation engine can be included. The negotiation engine can be communicatively linked to the merchant objectives data store wherein the negotiation engine can mediate between the merchant and the consumer to conclude the electronic commerce transaction. Also, a merchant agent for negotiating the electronic commerce transaction on behalf of the merchant can be included. The merchant agent can communicate with the negotiation engine and the merchant objectives data store.

The system further can include a consumer privacy rules data store comprising rules for disclosing the selected consumer information items. The consumer privacy rules data store can include selected consumer information items. A consumer agent for negotiating the electronic commerce transaction on behalf of the consumer also can be included. The consumer agent can communicate with the negotiation engine and the consumer privacy rules data store. Still, the system can include a transaction processing system.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The invention concerns a method and system for negotiating an exchange of consumer information between a merchant and a consumer during an electronic commerce (e-commerce) transaction. For example, during an e-commerce transaction concerning the sale of a good, the merchant and consumer can negotiate modified terms for the transaction predicated upon an agreed upon exchange of private consumer information items. The term goods, as used herein, can refer to both goods and services.

In accordance with the inventive arrangements disclosed herein, both merchants and consumers can specify a series of rules comprising a privacy policy. The consumer can specify which consumer information can be freely distributed to a merchant. Also, the consumer can determine privacy rules for disclosing sensitive or private information to the merchant. For example, though a name, address, and credit card can be freely given during an e-commerce transaction, the consumer can specify that other more personal information is not to be transferred to the merchant unless the merchant provides compensation of at least a particular value. By comparison, the merchant objectives can specify the value of particular items of consumer information. For example, the merchant can specify goods, discounts, cash, or other cash equivalents which can be offered as incentives in exchange for particular consumer information items.

During the e-commerce transaction, the merchant and the consumer can negotiate a mutually satisfactory transaction through the use of intelligent agents which can negotiate through a facilitator. The transaction can include an exchange of goods for an incentive such as a discounted price. For example, the discounted price can be based upon the type of private consumer information provided by the consumer to the merchant. If an agreement is reached, the transaction terms and conditions can be forwarded to an e-commerce processing system. If no agreement is reached, the merchant and the consumer can be so informed.

Figure 1:
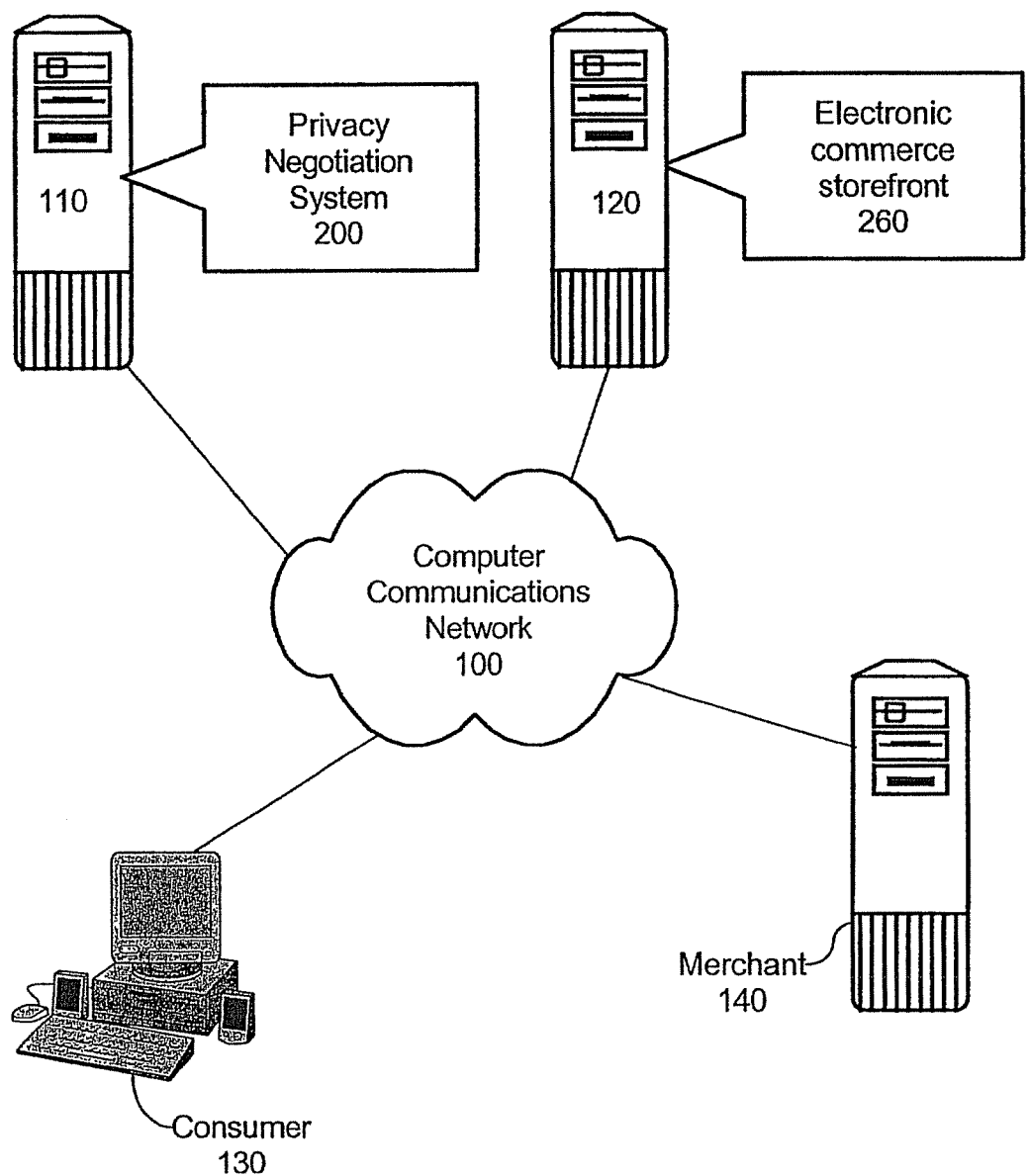
FIG. 1 is a pictorial representation of an exemplary system for use with the inventive.

FIG. 1 is a pictorial representation of an exemplary system including servers 110 and 120, a consumer computer system 130, and a merchant computer system 140, each communicatively linked through a computer communications network 100. For example, the computer communications network 100 can be the Internet where communication can be facilitated using TCP/IP, HTTP, and FTP protocols, each well known in the art. Alternatively, communication can be facilitated through direct network access, a local area network, a wide area network, an Integrated Service Digital Network (ISDN) connection, or a series of direct dial up connections initiated by the merchant and consumer computer systems 130 and 140 respectively. Any suitable method of connecting computers in a computer communications network can be used as well as any suitable network protocol for information exchange such as electronic data interchange (EDI) as is commonly used in business applications.

Server 110 can include an privacy negotiation system 200 and server 120 can include an e-commerce storefront 260 (e-commerce site). Servers 110 and 120 can be application servers, commerce servers, database servers, or any other server that can operate on the Internet. The e-commerce site 260 can be a Web site for example, configured to sell items or otherwise conduct commerce via the Internet. Using consumer computer system 130, a consumer can visit the e-commerce site 260 via the Internet to purchase items being offered for sale, as well as interact with the privacy negotiation system 200 to specify consumer privacy rules and conditions for the exchange of consumer information items. The merchant computer system 140 can be used by a merchant to access the e-commerce site 260 as well as the privacy negotiation system 200 to perform administrative functions such as administering merchant business objectives and privacy policies.

Figure 2:
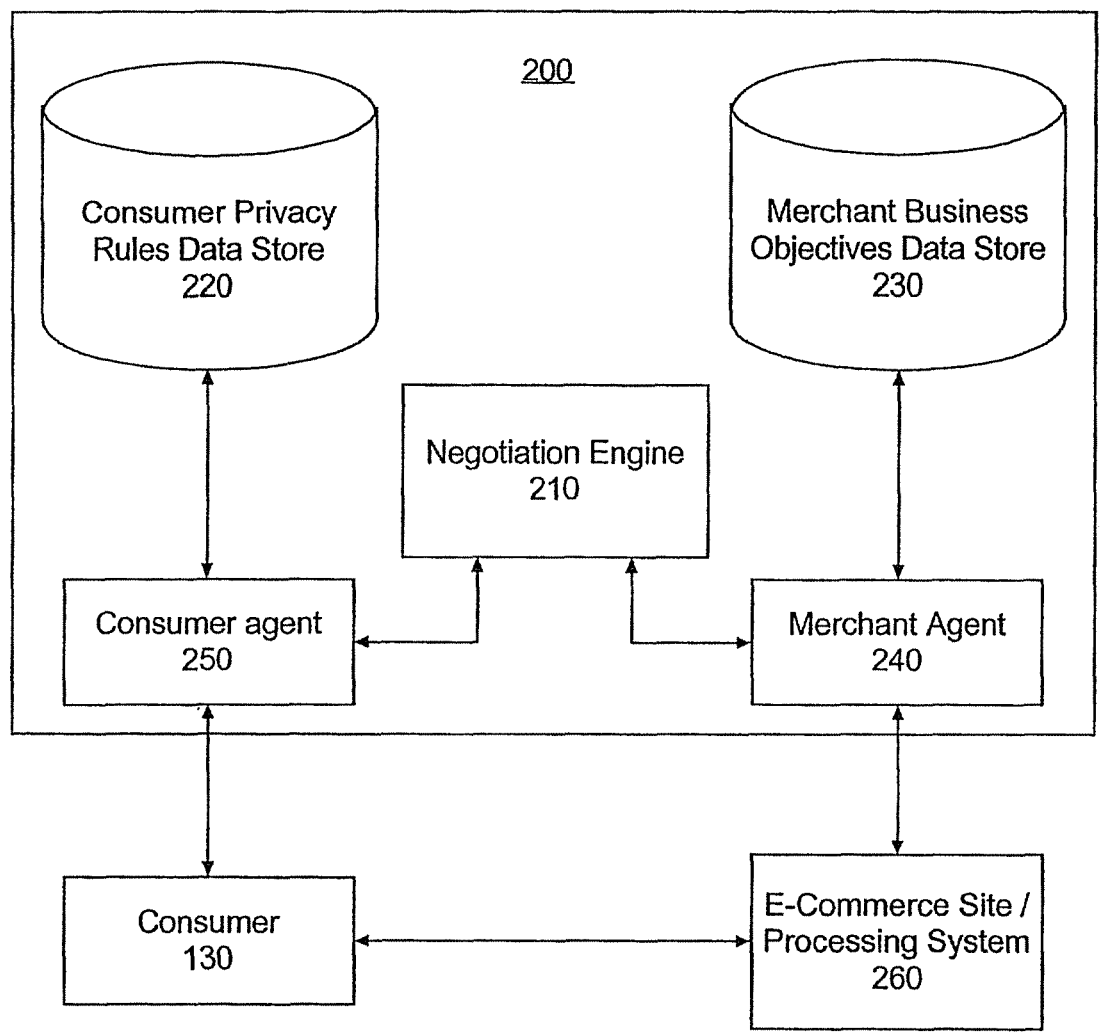
FIG. 2 is a schematic diagram illustrating an exemplary privacy negotiation system.

FIG. 2 is a schematic diagram illustrating one embodiment of the invention including the privacy negotiation system 200 in conjunction with the e-commerce site 260 of FIG. 1. Although the components of FIG. 2 can be distributed across multiple computer systems within a computer network, the privacy negotiation system 200 and the e-commerce site 260 can be located within a single computer system. The merchant computer system 140 (not shown) and the consumer computer system 130 can communicate with both the privacy negotiation system 200 as well as the e-commerce site 260. The privacy negotiation system 200 and the e-commerce site 260 can include suitable security protocols preventing unauthorized access to the computer systems. For example, the merchant can be provided secure access to the privacy negotiation system 200 and the e-commerce site 260 for administering merchant data, while the consumer can be provided secure access to the privacy negotiation system 200 for administering consumer data. The computer communications network has been omitted from FIG. 2 for purposes of illustration only.

The e-commerce site 260, similar to a conventional e-commerce Web site, can be programmed with a product data store, an electronic shopping cart or other method of selecting items for purchase, as well as the necessary functionality for processing financial transactions. The privacy negotiation system 200 can include a negotiation engine (NE) 210, a consumer privacy rules data store 220, a merchant business objectives data store 230, as well as a consumer agent 250 and a merchant agent 240. The consumer privacy rules data store 220 can include a plurality of rules and conditions specifying consumer privacy preferences. These rules can prioritize consumer information such as the consumer's name, address, credit card information or other financial account information, as well as demographic data including family information and household income according to user designated sensitivity or privacy levels. Thus, the consumer can prioritize and classify items of consumer information from the minimal items of consumer information required for the completion of a financial transaction up to the most sensitive or most private items of consumer information.

The consumer privacy rules data store 220 further can include rules specifying the conditions, if any, upon which consumer information designated as sensitive can be provided to a merchant. Such conditions can establish the minimum compensation amount necessary for providing sensitive items of consumer information to the merchant on a per item basis. As mentioned, the compensation can be provided to the consumer in the form of goods, discounts, cash, or other cash equivalents. For example, the rules can specify a minimal valuation which can be specified in dollars in exchange for which the consumer will agree to provide a particular item of consumer information such as the consumer's annual income. The rules further can specify whether the minimum can be met with goods, discounts, cash, or other cash equivalents which can be greater than or equal to the specified valuation. The rules also can specify that particular items are not to be provided to a merchant under any circumstances.

The merchant business objectives data store 230 can include a plurality of rules specifying business objectives and the privacy policy of the merchant. The merchant business objectives data store 230 can include rules defining required consumer information on a per transaction basis, in addition to specifying required consumer information for the purchase of a particular good or service. Additionally, the rules can specify incentives such as goods, discounts, cash, or other cash equivalents which the merchant is willing to provide the consumer in exchange for particular items of consumer information. The merchant can designate particular stocked items which the merchant can use for negotiating the exchange of consumer information. For example, the merchant can require a name, address, and credit card information for processing a transaction. The rules can specify that additional information such as the consumer's annual income is worth approximately $5.00. Accordingly, should the consumer provide that item of information, the merchant objectives can provide for a $5.00 discount, a good valued at approximately $5.00, or provide cash or a cash equivalent.

The invention also can include an optional consumer agent 250. The consumer agent 250 can be a conventional intelligent agent or bot, as is known in the art. The consumer agent 250 can be a program that can regularly gather information and perform a service without immediate supervision by the consumer. Specifically, the consumer agent 250 can access and utilize previously provided information, such as the information stored within the consumer privacy rules data store 220, to negotiate with the merchant through the negotiation engine. Also, past purchase behavior can be recorded by the consumer agent 250. The consumer agent 250 can be programmed to accept, reject, or make counter-offers regarding merchant offers of incentives consistent with consumer specified rules.

In one embodiment of the present invention, in addition to serving as an advocate for the consumer, the consumer agent 250 can provide the consumer with an interface for accessing the privacy negotiation system 200. In particular, the consumer agent 250 can enable the consumer to administer and update the rules contained within the consumer privacy rules data store 220. The invention, however, is not limited in this regard and can include a separate interface component (not shown) for providing the consumer access to the privacy negotiation system 200. For example, the user can access the consumer privacy rules data store 220 via a Web page interface to a server side program for administering the consumer privacy rules.

The merchant agent 240 is similar to the consumer agent 250, with the exception that the merchant agent 240 acts as an advocate for the merchant and can provide the merchant with an interface to the merchant business objectives data store 230. Similar to the above-mentioned description, the privacy negotiation system 200 can include a separate interface component for providing the merchant access to the merchant business objectives data store 230 for performing administrative functions and updating the data store.

While the consumer agent 250 and the merchant agent 240 are depicted as separate programs existing within the privacy negotiation system 200, those skilled in the art will appreciate that due to the autonomous nature of agents, the consumer agent 250 and the merchant agent 240 can be located at any of a variety of locations within the computer communications network. For example, the agents can exist within a proxy server, the privacy negotiation system 200, or another location on the computer communications network. The merchant agent 240 can be located within the e-commerce site 260 or the merchant computer system. The consumer agent 250 can be located within the consumer's Internet service provider or within the consumer computer system. Similarly, it should be appreciated that although the privacy negotiation system 200 and the e-commerce site 260 are shown as separate systems located within separate servers, the two systems can be combined into a single larger, more complex system.

The NE 210 can be programmed to communicate with the consumer agent 250 and the merchant agent 240. In particular, the NE 210 can mediate between the two agents to automate the negotiation process between the consumer and the merchant. The NE 210 can analyze the consumer privacy conditions and rules via the consumer agent 250 as well as the merchant business objectives and policies via the merchant agent 240 to determine whether a transaction can be performed. If so, the NE 210 can determine the terms and conditions of that transaction based upon the rules and policies accessed via the consumer and merchant agents. Notably, in the case wherein the agents do not provide interface functionality to the privacy negotiation system 200, the NE 210 can include such functionality.

Though the NE 210 can be a neutral mediator between the consumer and the merchant, in another embodiment of the invention, the NE 210 can be programmed with a bias towards either the merchant or the consumer. For example, the party installing the privacy negotiation system can bias the system towards that party's objectives. Thus, if the privacy negotiation system was installed by a consortium of merchants, the privacy negotiation system can be biased in favor or the merchants.

In operation, a consumer using consumer computer system 130 can visit the e-commerce site 260. The consumer can decide to purchase one or more items. Accordingly, during the consumer's shopping experience, during check-out, or in response to a check-out request, the merchant and the consumer can be logged into, or otherwise be identified by the privacy negotiation system 200. Having identified the each party, reference can be made to the consumer privacy rules data store 220 as well as the merchant business objectives data store 230. The NE 210 can consult the two data stores to determine whether additional consumer information can be provided to the merchant as well as the cost of such consumer information. For example, the consumer can be enticed with a discount or the offering of a particular merchant designated good. Similarly, the consumer can demand a particular item in return for which the consumer can provide the merchant with additional consumer information. Still, the merchant can waive certain information requirements if the consumer purchases a minimum amount of goods.

After analyzing the preferences of both the merchant and the consumer, the NE 210 can determine whether a transaction can be completed. If so, the NE 210 can provide the finalized transaction terms and conditions to a financial transaction processing system. If not, the NE 210 can notify the parties that no agreement was reached.

Figure 3:
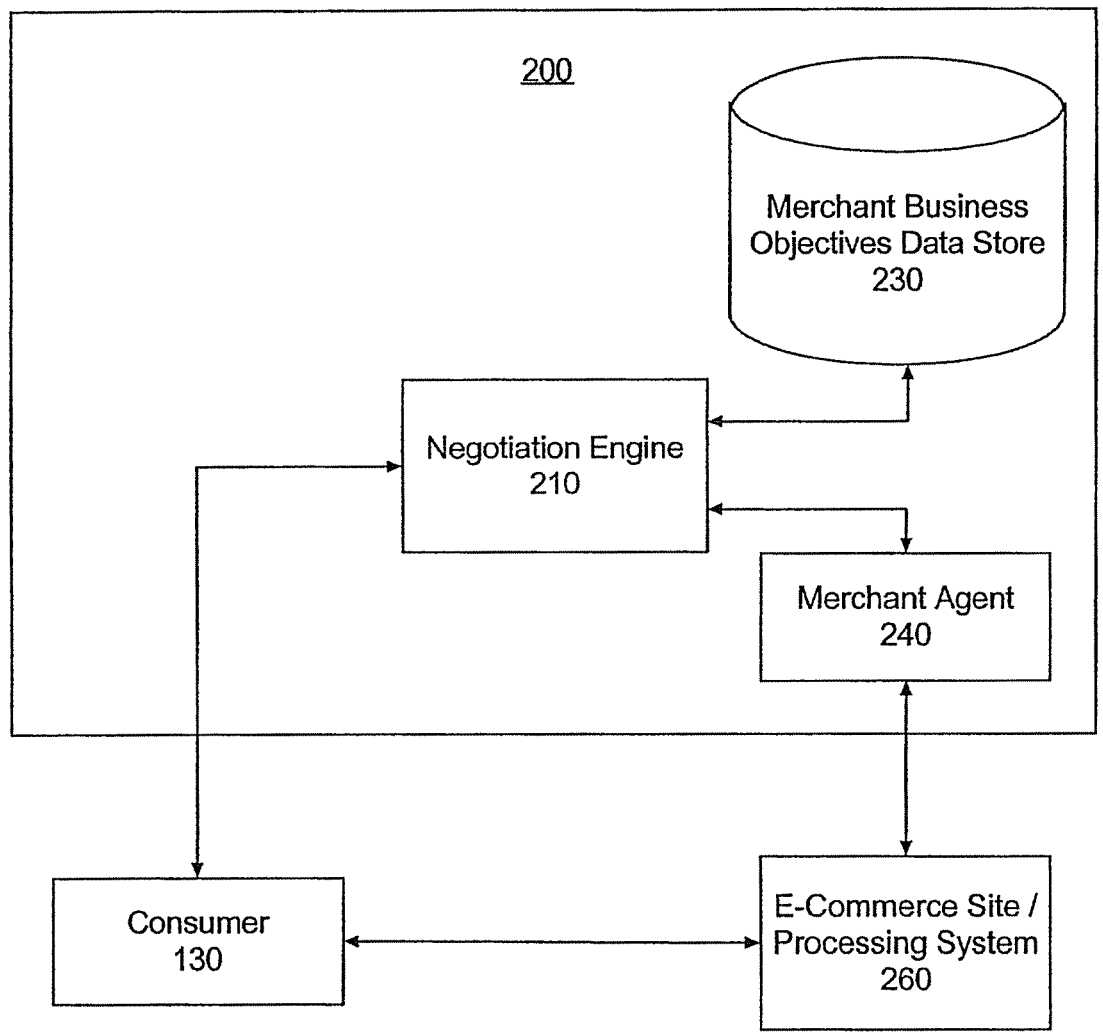
FIG. 3 is a schematic diagram illustrating another exemplary privacy negotiation system.

FIG. 3 is a schematic diagram illustrating another embodiment of the privacy negotiation system 200 of FIG. 1. As shown in FIG. 3, the privacy negotiation system 200 can include a merchant business objectives data store 230, an NE 210, and a merchant agent 240. In this embodiment, the privacy negotiation system 200 can exclude the consumer agent and the consumer privacy rules data store. The embodiment disclosed in FIG. 3 functions substantially the same as the embodiment of FIG. 2, with the exception that the consumer can interact directly with the NE 210. Accordingly, the consumer can specify the terms and conditions of the transaction as well as provide consumer information via keyboard or voice interactions. Thus, the consumer can negotiate the transaction and decide upon which consumer information items to provide to the merchant in exchange for particular incentives. Notably, the NE 210 can be configured to interact directly with the consumer rather than through a consumer agent.

Figure 4:
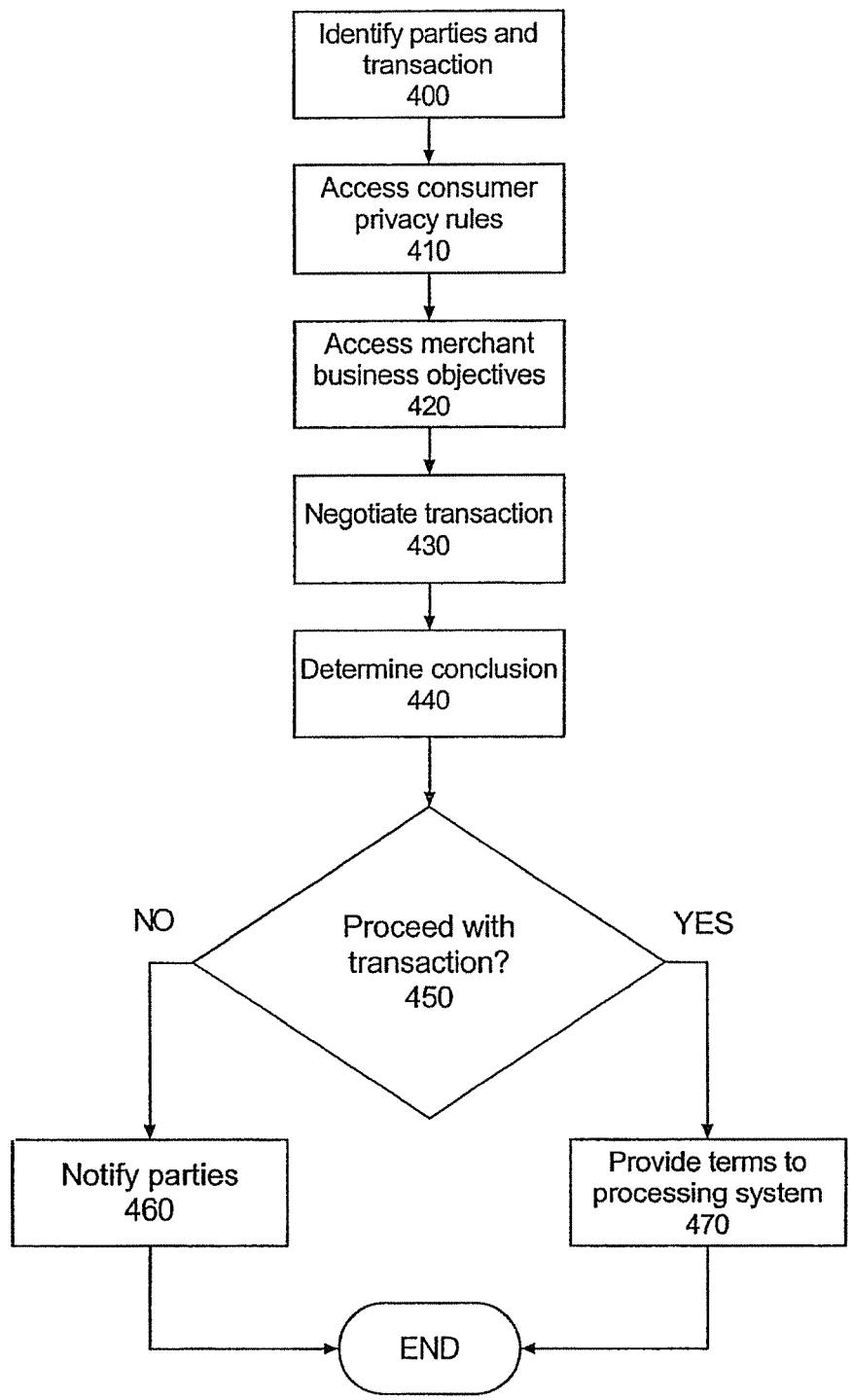
FIG. 4 is a flow chart illustrating an exemplary process for negotiating the exchange of private consumer information.

FIG. 4 is a flow chart illustrating an exemplary process of negotiating the exchange of private consumer information between a merchant and a consumer using the negotiation system of FIG. 2. The method can begin in a state wherein the consumer has specified rules within the consumer privacy rules data store. Additionally, the merchant also can have specified one or more rules in the merchant business objectives data store. The consumer can visit an e-commerce storefront and can identify one or more goods to be purchased.

In step 400, the negotiation system can identify the parties involved in the potential transaction. For example, the consumer can be identified through conventional methods known in the art such as a login process or through the use of identifiers placed on the consumer's system such as cookies. If the negotiation system functions as a component of the e-commerce site, the merchant automatically can be identified. In an alternative embodiment, wherein the negotiation system functions as a third-party system, the merchant can initiate communications with the negotiation system through a login process. In that case, the e-commerce storefront can provide the negotiation system with consumer information as well as the transaction information such as the particular goods the consumer has identified for purchase.

In step 410, the consumer rules can be accessed from the consumer privacy rules data store. For example, after having identified the parties and proposed transaction, the consumer agent can consult the consumer rules to determine whether the proposed transaction and any other incentives are consistent with the consumer specified privacy rules.

In step 420, the merchant objectives can be accessed from the merchant business objectives and policies data store. For example, the merchant agent can consult the merchant objectives to determine which incentives to offer the consumer based upon desired consumer information, the consumer's identity, as well as the subject goods of the transaction.

In step 430, through the negotiation engine, the parties can negotiate a transaction through their respective agents. For example, the consumer agent can be programmed to begin asking for incentives with monetary values at the upper limit of the range specified in the consumer privacy rules. In contrast, the merchant agent can be programmed to begin offering incentives with a valuation at the lower limit of the merchant specified objectives. Through the negotiation engine, the agents can barter back and forth to determine whether an agreement can be reached.

It should be appreciated that the merchant objectives data store can be expanded to include information about prior transactions involving the consumer. Accordingly, the merchant objectives can be configured to favor frequent consumers. Also, the merchant objectives can be configured to disfavor, or provide less favorable transaction terms to consumers with poor payment histories or credit histories.

In an alternative embodiment of the invention, the consumer can deal directly with the merchant through the negotiation engine without a consumer agent. In that case, the consumer can provide responses to the negotiation engine directly. For example, the consumer can type, speak, or respond to graphically presented prompts and controls to accept, reject, or make counter-offers to the merchant. Notably, the consumer can interact directly with the negotiation engine or via the e-commerce site wherein the consumer responses can be provided to the negotiation engine. In either case, however, due to the exclusion of the consumer agent, this embodiment of the invention need not include a consumer privacy rules data store. Because the consumer can interact with the negotiation system on his own behalf, and therefore, specify which terms are or are not acceptable, the consumer privacy rules data store need not be included. It should be appreciated however, that some types of consumer information can be stored. For example, past transactions with the consumer as well as previously acquired consumer demographic information can be stored on the merchant side of the negotiation system to aid the merchant agent in responding, accepting, rejecting, or making counter-offers to the consumer.

In step 440, a conclusion to the transaction can be reached. Specifically, as a result of the negotiations between the consumer and the merchant, the parties can determine that either the proposed transaction can continue and be processed, or that no agreement was reached. Consequently, in step 450, based upon the conclusion, a further determination can be made whether to continue with the transaction. If so, the method can continue to step 470. If not, the method can continue to step 460.

In step 460, the parties can be notified that no agreement was reached. After completion of step 460, the method can end. The method, however, can be repeated as necessary for other proposed transactions between different parties or between the same parties concerning a different proposed transaction.

In step 470, a determination has been made to proceed with the proposed transaction. In that case, the negotiated terms of the proposed transaction can be provided to a financial processing system to complete the transaction. After completion of step 470, the method can end. As mentioned, the method can be repeated as necessary for subsequent parties or transactions.

The present invention can be realized in hardware, software, or a combination of hardware and software. A method and system in accordance with the inventive arrangements disclosed herein can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A computer-implemented method of negotiating an electronic commerce (e-commerce) transaction between a merchant and a consumer for the sale of a selected good comprising performing, via a processor, the steps of:

identifying an asking price for the selected good;
retrieving from memory merchant business objectives (MBOs) for the merchant and merchant data about prior transactions between the consumer and the merchant, wherein the MBOs specify a plurality of different objectives based on consumer purchase frequency, consumer payment history, and consumer credit history;
based upon the MBOs and the merchant data, selecting one of the plurality of different objectives and determining a corresponding merchant valuation for each of a plurality of classes of merchant-requested information based on the one of the plurality of different objectives;
retrieving consumer privacy rules (CPRs) from a different memory;
based upon the CPRs, determining a consumer-specific minimal valuation for each of a plurality of classes of consumer-specific information;
determining whether an agreement can be reached for a sale of the selected good with an incentive for providing consumer-specific information from the at least one class of consumer-specific information, wherein the incentive is determined based upon a comparison of a merchant valuation corresponding to the at least one merchant-requested information class and a minimal valuation corresponding to the at least one consumer-specific information class;
consummating the e-commerce transaction for the sale of the selected good with said incentive if it is determined that an agreement can be reached.

2. The method of claim 1, said consummating step further comprising:
providing agreed upon e-commerce transaction information to an e-commerce processing system for processing said e-commerce transaction.

3. The method of claim 1, further comprising:
receiving a counter-offer, said counter-offer specifying an adjusted incentive.

4. The method of claim 1, further comprising:
receiving a counter-offer, said counter-offer specifying an adjusted asking price corresponding to said proposed exchange of consumer information.

5. The method of claim 1, further comprising:
adjusting said incentive consistent with said one of the plurality of different objectives.

6. The method of claim 1, further comprising:
adjusting said asking price consistent with said CPRs.

7. The method of claim 1, wherein said incentive is selected from the group consisting of a discount, an additional good, cash, and a cash equivalent.

8. The method of claim 7, wherein said consumer privacy rules further specify an acceptable incentive type for the exchange of selected consumer information.

9. A method of negotiating an electronic commerce (e-commerce) transaction between a merchant and a consumer for the sale of a selected good comprising performing, via a processor, the steps of:
identifying an asking price for the selected good;
obtaining merchant data associated with the consumer, the merchant data comprising consumer demographic information about the consumer;
retrieving from memory merchant business objectives (MBOs) based on the merchant data to yield retrieved MBOs, said retrieved MBOs comprising a series of merchant-specified rules specifying a plurality of cash or cash-equivalent incentives offered to a consumer associated with selected demographic information in exchange for consumer-specific information, wherein the retrieved MBOs specify objectives are based on a consumer purchase frequency, a consumer payment history, and a consumer credit history;

retrieving consumer privacy rules (CPRs) from a different memory;

based upon the CPRs, determining a consumer-specific minimal valuation of the consumer-specific information;

determining whether an agreement can be reached for a sale of the selected good with an incentive for providing the consumer-specific information, wherein the incentive is determined based upon the minimal valuation in comparison to a merchant valuation of the consumer-specific information based on the retrieved MBOs;

consummating the e-commerce transaction for the sale of the selected good with said incentive if it is determined that an agreement can be reached.

10. The method of claim 9, said consummating step further comprising:

providing agreed upon e-commerce transaction information to an e-commerce processing system for processing said e-commerce transaction.

11. The method of claim 9, further comprising:

receiving a counter-offer, said counter-offer specifying an adjusted incentive.

12. The method of claim 9, further comprising:

receiving a counter-offer, said counter-offer specifying an adjusted asking price corresponding to said proposed exchange of consumer information.

13. The method of claim 9, further comprising:

adjusting said incentive consistent with said retrieved MBOs.

14. The method of claim 9, further comprising:

adjusting said asking price consistent with said CPRs.

15. The method of claim 9, wherein said incentive is selected from the group consisting of a discount, an additional good, cash, and a cash equivalent.

16. The method of claim 15, wherein said consumer privacy rules further specify an acceptable incentive type for the exchange of selected consumer information.

17. A privacy negotiation system for negotiating an electronic commerce transaction between a merchant and a consumer involving a transfer of selected consumer information items, said system comprising:

a memory for storing a merchant objectives data store comprising merchant-specified rules for offering incentives to a consumer during said electronic commerce transaction for a selected good; and at least one processor comprising a negotiation engine and a merchant agent, wherein the negotiation engine is communicatively linked to said merchant objectives data store and to a consumer privacy rules data store, wherein said negotiation engine is configured to retrieve merchant business objectives (MBOs) and merchant data from said merchant objectives data store, the merchant data comprising information about prior transactions between the merchant and the consumer and consumer demographic information about the consumer, wherein the MBOs specify a plurality of different objectives based on consumer purchase frequency, consumer payment history, and consumer credit history, based upon the MBOs and the merchant data, select one of the plurality of different objectives and determine a corresponding merchant valuation for consumer-specific information, retrieve consumer privacy rules (CPRs) from a different memory the consumer privacy rules data store, based upon the CPRs, determine a consumer-specific minimal valuation for the consumer-specific information, and determine whether an agreement can be reached for a sale of the selected good with an incentive for providing the consumer-specific information to the merchant, wherein the incentive is determined based upon a comparison of the merchant valuation and the minimal valuation corresponding to the consumer-specific information class, and wherein the merchant agent is configured for negotiating said electronic commerce transaction on behalf of said merchant, and communicating with said negotiation engine and said merchant privacy rules data store.

18. The system of claim 17, the processing element further comprising:

a consumer agent for negotiating said electronic commerce transaction on behalf of said consumer, said consumer agent communicating with said negotiation engine and said consumer privacy rules data store.

19. The system of claim 17, wherein said consumer privacy rules data store further includes selected consumer information items.

20. The system of claim 17, the processing element further comprising:

a transaction processing system for completing the sale of the selected good with said incentive and by exchanging consumer information.

21. A non-transitory machine readable storage, having stored thereon a computer program for negotiating an electronic commerce (e-commerce) transaction between a merchant and a consumer having a plurality of code sections executable by a machine for causing the machine to perform the steps of:

identifying an asking price for the selected good;

retrieving from memory merchant business objectives (MBOs) for the merchant and merchant data about prior transactions between the consumer and the merchant, wherein the MBOs specify a plurality of different objectives based on consumer purchase frequency, consumer payment history, and consumer credit history;

based upon the MBOs and the merchant data, selecting a one of the plurality of different objectives and determining a corresponding merchant valuation for each of a plurality of classes of merchant-requested information based on the one of the plurality of different objectives;

retrieving consumer privacy rules (CPRs) from a different memory;

based upon the CPRs, determining a consumer-specific minimal valuation for each of a plurality of classes of consumer-specific information;

determining whether an agreement can be reached for a sale of the selected good with an incentive for providing consumer-specific information from the at least one class of consumer-specific information, wherein the incentive is determined based upon a comparison of a merchant valuation corresponding to the at least one merchant-requested information class and a minimal valuation corresponding to the at least one consumer-specific information class;

consummating the e-commerce transaction for the sale of the selected good with said incentive if it is determined that an agreement can be reached.

22. The machine readable storage of claim 21, further comprising:
providing agreed upon e-commerce transaction information to an e-commerce processing system for processing said e-commerce transaction.

23. The machine readable storage of claim 21, further comprising:
receiving a counter-offer, said counter-offer specifying an adjusted incentive.

24. The machine readable storage of claim 21, further comprising:
receiving a counter-offer, said counter-offer specifying an adjusted asking price corresponding to said proposed exchange of consumer information.

25. The machine readable storage of claim 21, further comprising:
adjusting said incentive consistent with said one of the plurality of different objectives.

26. The machine readable storage of claim 21, said further comprising:
adjusting said asking price consistent with said CPRs.

27. The machine readable storage of claim 21, wherein said incentive is selected from the group consisting of a discount, an additional good, cash, and a cash equivalent.

28. The machine readable storage of claim 27, wherein said consumer privacy rules further specify an acceptable incentive type for the exchange of selected consumer information.

29. A non-transitory machine readable storage, having stored thereon a computer program for negotiating an electronic commerce (e-commerce) transaction between a consumer and a merchant having a plurality of code sections executable by a machine for causing the machine to perform the steps of:
identifying an asking price for the selected good;
obtaining merchant data associated with the consumer, the merchant data comprising information about prior transactions between the merchant and the consumer and consumer demographic information about the consumer;
retrieving from memory merchant business objectives (MBOs) based on the merchant data to yield retrieved MBOs, said retrieved MBOs comprising a series of merchant-specified rules specifying a plurality of cash or cash-equivalent incentives offered to a consumer associated with selected demographic information in exchange for consumer-specific information, wherein the retrieved MBOs specify objectives based on a consumer purchase frequency, a consumer payment history, and a consumer credit history;
retrieving consumer privacy rules (CPRs) from a different memory;
based upon the CPRs, determining a consumer-specific minimal valuation of the consumer-specific information;
determining whether an agreement can be reached for a sale of the selected good with an incentive for providing the consumer-specific information, wherein the incentive is determined based upon the minimal valuation in comparison to a merchant valuation of the consumer-specific information based on the retrieved MBOs;
consummating the e-commerce transaction for the sale of the selected good with said incentive if it is determined that an agreement can be reached.

30. The machine readable storage of claim 29, further comprising:
providing agreed upon e-commerce transaction information to an e-commerce processing system for processing said e-commerce transaction.

31. The machine readable storage of claim 30, wherein said incentive is selected from the group consisting of a discount, an additional good, cash, and a cash equivalent.

32. The machine readable storage of claim 31, wherein said consumer privacy rules further specify an acceptable incentive type for the exchange of selected consumer information.

33. The machine readable storage of claim 29, further comprising:
receiving a counter-offer, said counter-offer specifying an adjusted incentive.

34. The machine readable storage of claim 29, further comprising:
receiving a counter-offer, said counter-offer specifying an adjusted asking price corresponding to said proposed exchange of consumer information.

35. The machine readable storage of claim 29, further comprising:
adjusting said incentive consistent with said retrieved MBOs.

36. The machine readable storage of claim 29, further comprising:
adjusting said asking price consistent with said CPRs.

* * * * *